(12) United States Patent
Winter et al.

(10) Patent No.: US 9,333,845 B2
(45) Date of Patent: May 10, 2016

(54) VEHICLE MOUNTED FUEL CELL ASSEMBLY

(75) Inventors: Franz Winter, Mainz (DE); Reiner Essinger, Lauteral (DE); Thomas Vogel, Griesheim (DE); Michael J. Gorman, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2354 days.

(21) Appl. No.: 11/534,329

(22) Filed: Sep. 22, 2006

(65) Prior Publication Data

US 2008/0073133 A1 Mar. 27, 2008

(51) Int. Cl.
| | |
|---|---|
| *H01M 8/02* | (2006.01) |
| *B60L 11/18* | (2006.01) |
| *H01M 8/24* | (2006.01) |
| *B60K 1/04* | (2006.01) |

(52) U.S. Cl.
CPC .............. *B60K 1/04* (2013.01); *H01M 8/2465* (2013.01); *H01M 2250/20* (2013.01); *Y02T 90/32* (2013.01)

(58) Field of Classification Search
CPC ........... H01M 8/02; H01M 8/24; B60L 11/18; B60K 1/04; B60K 2001/04
See application file for complete search history.

(56) References Cited

U.S. PATENT DOCUMENTS

| | | | | |
|---|---|---|---|---|
| 5,740,876 A | * | 4/1998 | Shimose et al. | 180/232 |
| 2002/0100622 A1 | * | 8/2002 | Shimizu et al. | 180/65.1 |
| 2002/0189873 A1 | * | 12/2002 | Mizuno | 180/65.3 |
| 2003/0038470 A1 | * | 2/2003 | Chernoff et al. | 280/782 |
| 2003/0070858 A1 | * | 4/2003 | Kondo | 180/291 |
| 2004/0108151 A1 | * | 6/2004 | Guidry et al. | 180/65.3 |
| 2006/0102398 A1 | * | 5/2006 | Mizuno | 180/65.3 |
| 2007/0007060 A1 | * | 1/2007 | Ono et al. | 180/65.3 |
| 2008/0073133 A1 | | 3/2008 | Winter et al. | |

FOREIGN PATENT DOCUMENTS

EP 1309026 A1 * 5/2003 .............. H01M 8/24

* cited by examiner

*Primary Examiner* — Edu E Enin-Okut
(74) *Attorney, Agent, or Firm* — BrooksGroup

(57) ABSTRACT

A power distribution unit for a vehicle includes a fuel cell stack, a bracket connected to the fuel cell stack and including at least one mount adapted to be connected directly to a vehicle to directly interconnect the fuel cell stack to the vehicle, a connection feature, and a traction system communicated with the fuel cell stack and carried by at least one of the fuel cell stack and the bracket with the connection feature disposed between the traction system and said at least one of the fuel cell stack and the bracket so that the traction system is indirectly connected to the vehicle. In one implementation, the connection feature includes an elastomeric pad disposed between a housing of the traction system and a mount or the vehicle frame. The pad provides a so-called "soft mount" of the traction system to the vehicle.

23 Claims, 2 Drawing Sheets

VEHICLE MOUNTED FUEL CELL ASSEMBLY

TECHNICAL FIELD

The present disclosure relates generally to vehicles and more particularly to vehicles including fuel cell power units.

BACKGROUND

Automotive vehicles may include a body having a frame, a plurality of wheels carried by the frame and a power unit also carried by the frame that drives the wheels for rotation. The power unit may take many forms including an internal combustion engine or an electric motor. Electric motors may be powered by various sources including batteries of various types and/or fuel cells.

SUMMARY

A power distribution unit for a vehicle includes a fuel cell stack, a bracket connected to the fuel cell stack and including at least one mount adapted to be connected directly to a vehicle to directly interconnect the fuel cell stack to the vehicle, a connection feature, and a traction system communicated with the fuel cell stack and carried by at least one of the fuel cell stack and the bracket with the connection feature disposed between the traction system and said at least one of the fuel cell stack and the bracket so that the traction system is indirectly connected to the vehicle. In one implementation, the connection feature includes an elastomeric pad disposed between a housing of the traction system and a mount or the vehicle frame. The pad may provide a so-called "soft mount" of the traction system to the vehicle.

DESCRIPTION OF THE DRAWINGS

Exemplary embodiments of the present invention will become more fully understood from the detailed description and the accompanying drawings, wherein.

DESCRIPTION OF EXEMPLARY EMBODIMENTS

Figure 1:
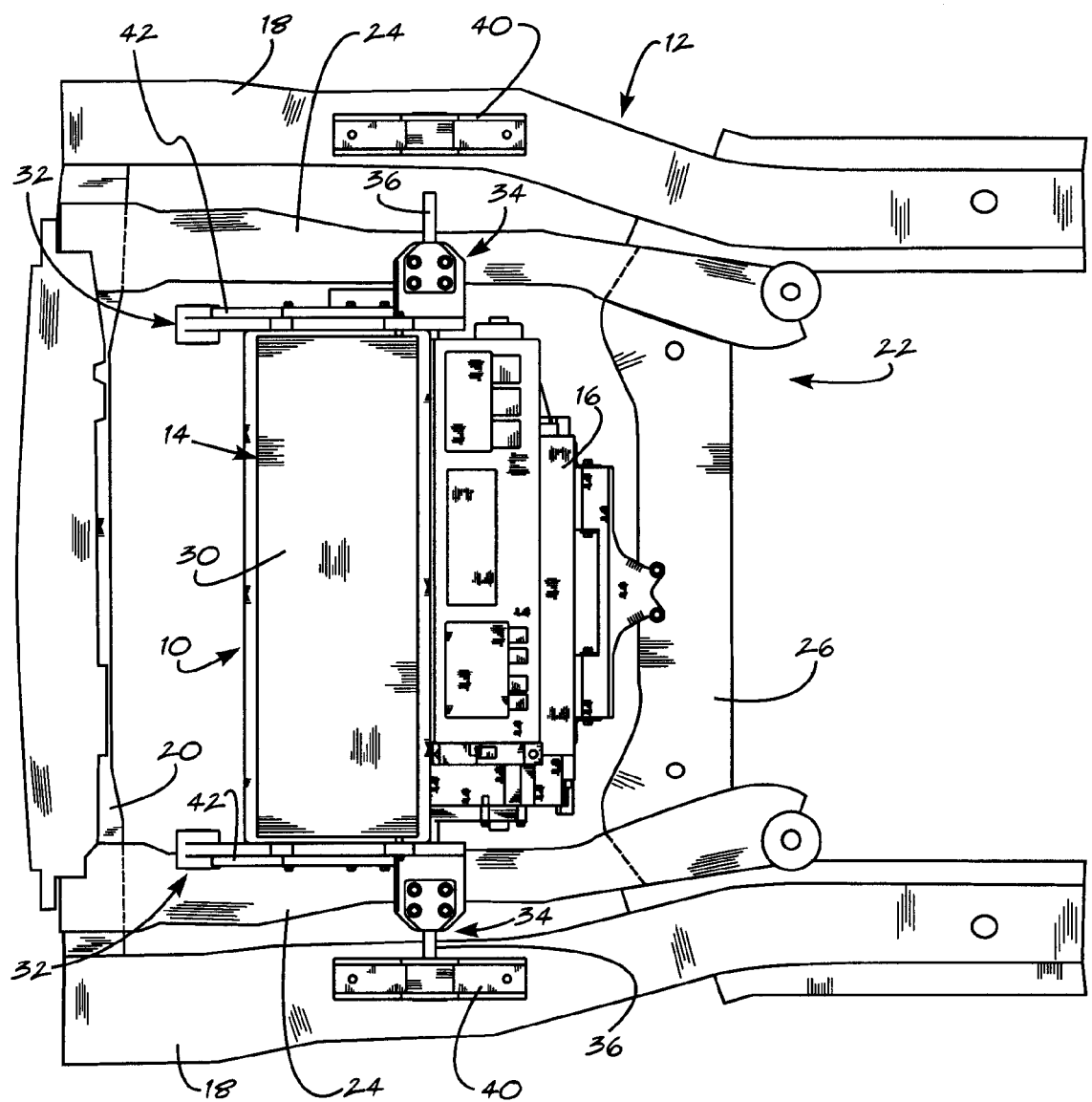
FIG. 1 is a plan view of a portion of a vehicle frame illustrating one presently preferred embodiment of a power distribution unit carried by the vehicle frame.

Referring in more detail to the drawings, FIG. 1 illustrates a portion of a vehicle power distribution unit 10 carried by and preferably directly mounted to a vehicle frame 12. The power distribution unit 10 preferably includes a fuel cell stack 14 and an electric traction system (ETS) 16 connected to the fuel cell stack 14 and the frame 12 by one or more brackets or mounts. The electric energy generated by the fuel cell stack 14 is converted to mechanical energy by the ETS 16 which may include a controller, a motor and a gearbox, for driving a shaft connected to one or more wheels of the vehicle.

The fuel cell stack 14 is preferably directly mounted to the vehicle frame 12. The ETS 16 is preferably soft mounted to the fuel cell stack 14 and to the vehicle such that it is not rigidly connected to either. In this manner, the fuel cell stack 14 does not significantly move or vibrate relative to the frame 12 which may reduce the shake of the vehicle front end and improve the driving comfort of the vehicle. While the ETS 16 may vibrate or move slightly relative to the fuel cell stack and the vehicle frame 12, it has a relatively light weight and a relatively high frequency of bounce or vibration which has a lesser affect on front end shake and the driving comfort of the vehicle.

As shown in FIG. 1, the frame 12 may include spaced apart and generally parallel side rails 18 interconnected by a front transverse beam 20, and by a sub frame 22. The sub frame 22 may include a pair of generally parallel rails 24 which may be disposed generally vertically beneath the side rails 18. The sub frame rails 24 may be connected at one end to the transverse beam 20 and at their other end to a cross-member 26. Accordingly, these frame members define a compartment for an engine, a motor, or the power distribution unit 10, for example.

The power distribution unit 10 preferably includes the fuel cell stack 14 which has an outer housing 30 to which brackets 32 are connected. Upper mounts 34 are disposed one on each of a pair of opposed sides of the fuel cell stack 14 and each may be carried by a separate bracket 32. The upper mounts 34 preferably include an outwardly extending shaft 36 connected to a plate 38 that is bolted or otherwise fastened, connected or adhered to the bracket 32. Each shaft 36 is received in a respective clamp 40, and each clamp 40 is in turn bolted to the side rails 18 of the vehicle frame 12. When mounting the power distribution unit 10 to the vehicle, the shafts 36 may be disposed in their clamps 40 to carry the weight of the power distribution unit 10 without securely tightening the clamps 40 on the shafts 36. This permits movement or rotation of the power distribution unit 10 relative to the frame 12 to facilitate aligning and connecting the bracket 32 and other engine mounts to the frame 12.

Figure 2:
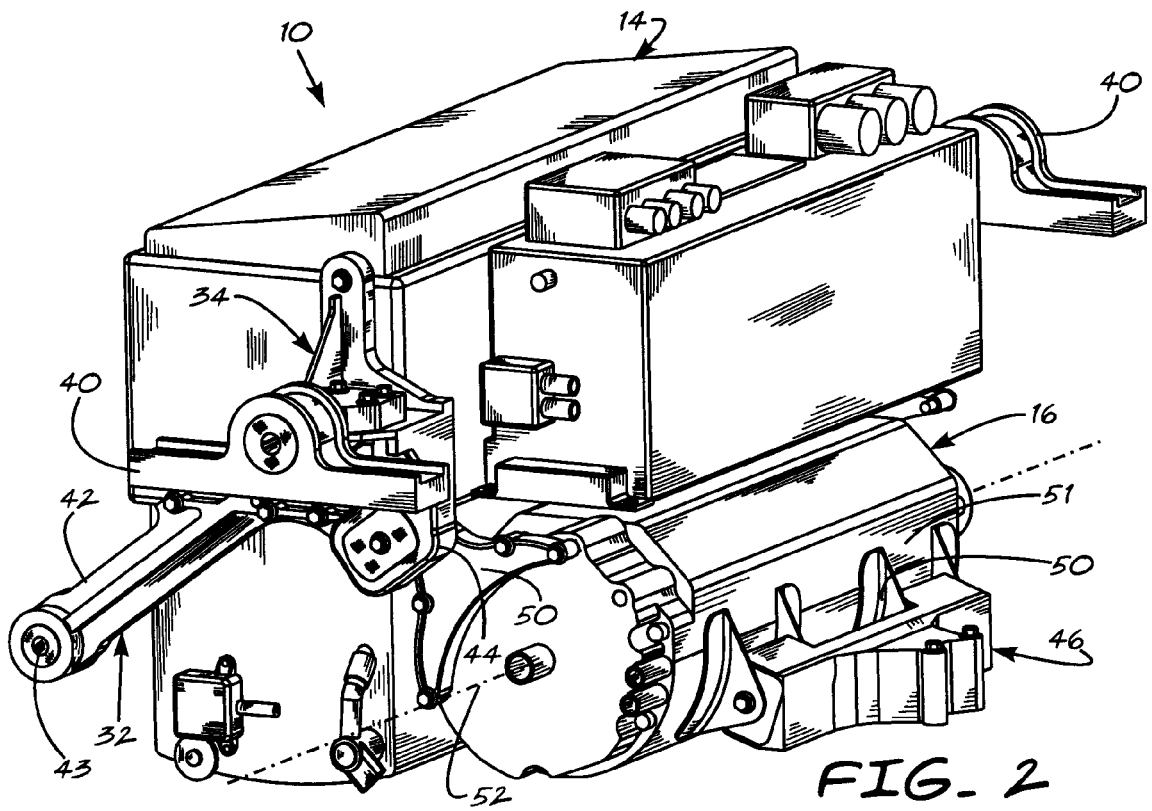
FIG. 2 is a perspective view illustrating a left side of the power distribution unit and related connected components such as an electric traction system and a plurality of mounts.
Figure 3:
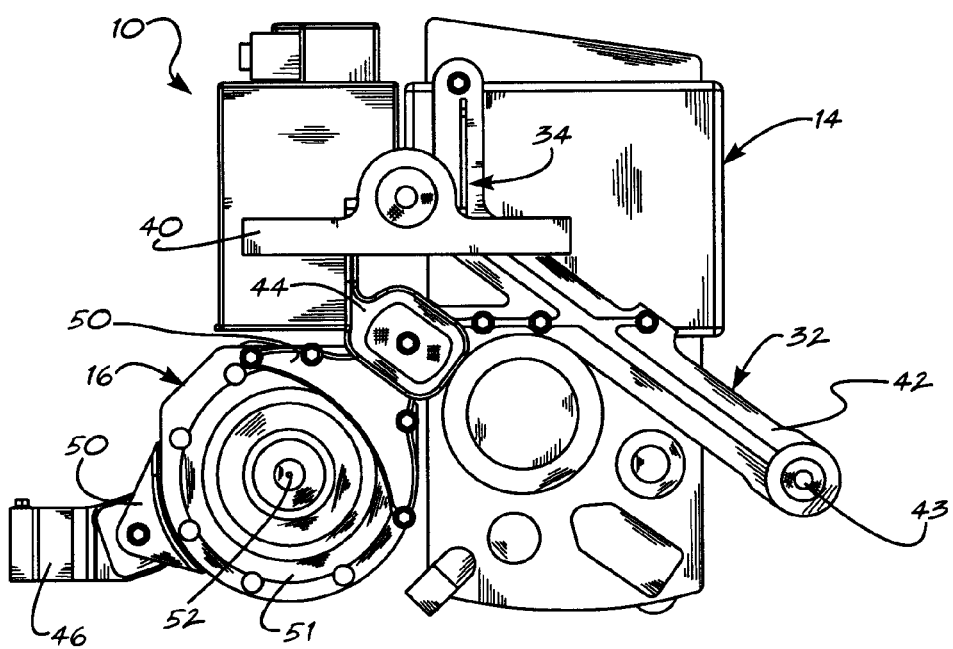
FIG. 3 is a right side view of the power distribution unit and related components.

As best shown in FIGS. 2 and 3, each bracket 32 preferably includes an outwardly extending arm 42 that has a second or a forward mount portion 43 adapted to be connected directly to the vehicle frame 12, such as to one of the rails 24 of the sub frame 22, generally toward the forward portion of the vehicle frame adjacent to the transverse beam 20. A third or middle mount 44 preferably is disposed between the ETS 16 and the fuel cell stack 14 and may be adapted to permit direct connection of that area of the bracket 32 to the vehicle frame 12, such as to a rail 24 of the sub frame 22. A fourth or rearward mount 46 preferably is disposed laterally between the opposed sides of the fuel cell stack 14 and extends outwardly from the ETS 16 and/or fuel cell stack 14 and may be adapted to be connected to the cross-member 26 of the vehicle sub frame 22. The various mounts may be constructed to be bolted to the adjacent vehicle frame members, or may carry shafts which may be clamped or otherwise connected to the vehicle sub frame, or may permit other suitable attachments of the power distribution unit 10 to the frame 12.

Preferably, the ETS 16 is carried by the bracket 32 with a connection feature 50 disposed between them so that loads transferred between the vehicle frame 12, the fuel cell stack 14 and the ETS 16 may be dampened or attenuated. The connection feature 50 may be disposed between a housing 51 of the ETS 16 and one or both mounts 44, 46 and may include an elastomeric pad or other dampener or resilient member, as desired. The connection feature 50 may at least partially isolate the ETS 16 from vehicle loads, vibrations and the like that are transferred in and to the frame 12. The ETS 16 preferably has a center line or axis 52 and a portion of the middle and rearward engine mounts 44, 46, respectively, preferably are disposed generally on opposed sides of the ETS and along a line that intersects the axis 52 of the ETS 16. Since the mounts 44, 46 may be connected to the ETS 16 at more than a single point or location, the area spanned by the connection of the mounts 44, 46 to the ETS preferably brackets or encompasses a line that intersects the axis 52 and a portion of each mount 44 and 46. In at least some implementations, this may provide improved balance against the torque of the ETS to minimize force transfer to the brackets.

So constructed, arranged and mounted to a vehicle frame 12, movement of the power distribution unit 10 relative to the frame may be reduced. Front end shake that would otherwise be attributed to the movement of the relatively heavy fuel cell stack 14 is reduced or eliminated which improves the driving comfort of the vehicle. The stiffness of the vehicle frame 12 and body can also be improved with the power distribution unit 10 connected across and tying together the frame members 18, 20, 24, 26 of the vehicle frame and sub frame. Further, the power distribution unit 10 could be used in the same engine compartment as an engine of an internal combustion engine vehicle which facilitates vehicle design and engineering. While the ETS is shown as being carried by and connected to the bracket, the ETS could be connected to or carried by the fuel cell stack or adjacent components of the power distribution unit, and optionally to the vehicle frame.

The above description of certain embodiments of the invention is merely exemplary in nature and, thus, variations, modifications and/or substitutions thereof are not to be regarded as a departure from the spirit and scope of the invention. An apparatus or assembly embodying the present invention may have none, some, or all of the noted features and/or advantages. That certain features are included in the presently preferred embodiments set forth herein should not be constructed to mean that all embodiments of the present invention must have such features.

The invention claimed is:

1. A power distribution unit for a vehicle, comprising:
   a fuel cell stack;
   a bracket connected to the fuel cell stack via a first mount adapted to be connected directly to a vehicle in order to interconnect the fuel cell stack to the vehicle, a second mount adapted to be connected to the vehicle at a location away from the first mount in order to interconnect the fuel cell stack to the vehicle, a third mount adapted to be connected to the vehicle at a location away from the first and second mounts in order to interconnect the fuel cell stack to the vehicle, and a fourth mount adapted to be connected to the vehicle at a location away from the first, second, and third mounts in order to interconnect the traction system to the vehicle;
   a connection feature; and
   a traction system communicated with the fuel cell stack and carried by at least one of the fuel cell stack or the bracket with the connection feature disposed between the traction system and said at least one of the fuel cell stack or the bracket so that the traction system is indirectly connected to the vehicle, wherein a first portion of the connection feature is disposed between the third mount and the traction system to dampen loads therebetween, and wherein a second portion of the connection feature is disposed between the fourth mount and the traction system to dampen loads therebetween.

2. The power distribution unit of claim 1 wherein the connection feature is formed from a resilient material.

3. The power distribution unit of claim 2 wherein the connection feature is formed from an elastomeric material.

4. The power distribution unit of claim 1 wherein the traction system includes an axis and the first mount and second mount are disposed on opposed sides of the axis.

5. The power distribution unit of claim 4 wherein a portion of the first mount and the second mount are disposed along a line that generally intersects the axis of the traction system.

6. The power distribution unit of claim 1 wherein the traction system is carried by the bracket with the connection feature disposed between the bracket and the traction system.

7. The power distribution unit of claim 1 wherein the traction system is carried by the fuel cell stack.

8. The power distribution unit of claim 1 wherein the fuel cell stack is rigidly connected to the vehicle.

9. A vehicle including a fuel cell unit, comprising:
   a frame including a plurality of frame members;
   a power distribution unit including a fuel cell stack, and a traction system coupled to the fuel cell stack;
   a bracket connected to the fuel cell stack via a first mount adapted to be connected directly to a vehicle in order to interconnect the fuel cell stack to the vehicle, a second mount adapted to be connected to the vehicle at a location away from the first mount in order to interconnect the fuel cell stack to the vehicle, a third mount adapted to be connected to the vehicle at a location away from the first and second mounts in order to interconnect the fuel cell stack to the vehicle, and a fourth mount adapted to be connected to the vehicle at a location away from the first, second, and third mounts in order to interconnect the traction system to the vehicle; and
   a connection feature connecting the traction system with the fuel cell stack via the bracket so that the traction system is indirectly connected to the fuel cell stack and the bracket, wherein the connection feature is disposed between the traction system and at least one of the third mount or fourth mount.

10. The vehicle of claim 9 wherein the frame members include a pair of generally parallel side rails and the bracket is connected to each of the side rails.

11. The vehicle of claim 10 wherein the frame members define at least part of a subframe and the bracket also is connected to the subframe.

12. The vehicle of claim 11 wherein the subframe includes two spaced rails and a cross member interconnecting the spaced rails and the bracket is connected to the cross member.

13. The vehicle of claim 12 wherein the bracket is connected to the two spaced rails.

14. The vehicle of claim 9 wherein the bracket includes at least one shaft that is connected at one end to the housing and at its other end to a frame member.

15. The vehicle of claim 9 wherein the connection feature includes a resilient pad.

16. The vehicle of claim 9 wherein the connection feature is disposed between the traction system and the bracket.

17. The vehicle of claim 9 wherein the connection feature is disposed between the traction system and the fuel cell stack.

18. The vehicle of claim 9 wherein the traction system has an axis and is connected to an adjacent component by a first mount and a second mount on opposed sides of the axis.

19. The vehicle of claim 18 wherein a portion of each of the first mount and the second mount lie in a line that intersects the axis.

20. The power distribution unit of claim 1 wherein the traction system includes at least a drive motor.

21. The power distribution unit of claim 1 wherein the first, second, and third mounts are provided via a first bracket, and wherein the fourth mount is provided via a second bracket that is separate and distinct from the first bracket.

22. The vehicle of claim 9, wherein a first portion of the connection feature is disposed between the third mount and the traction system to dampen loads there between.

23. The vehicle of claim 22, wherein a second portion of the connection feature is disposed between the fourth mount and the traction system to dampen the loads therebetween.

\* \* \* \* \*